(12) United States Patent
Yan et al.

(10) Patent No.: US 11,936,546 B1
(45) Date of Patent: Mar. 19, 2024

(54) LIVE TRAFFIC TRACING FOR PODS IN A NETWORK

(71) Applicant: VMware LLC, Palo Alto, CA (US)

(72) Inventors: Hang Yan, Shanghai (CN); Zhengsheng Zhou, Beijing (CN); Wenfeng Liu, Beijing (CN); Donghai Han, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 18/188,247

(22) Filed: Mar. 22, 2023

(30) Foreign Application Priority Data

Jan. 13, 2023 (WO) ................ PCT/CN2023/000008

(51) Int. Cl.
*H04L 12/26* (2006.01)
*H04L 43/0894* (2022.01)
*H04L 43/10* (2022.01)

(52) U.S. Cl.
CPC .......... *H04L 43/10* (2013.01); *H04L 43/0894* (2013.01)

(58) Field of Classification Search
CPC ............................ H04L 43/10; H04L 43/0894
See application file for complete search history.

(56) References Cited

U.S. PATENT DOCUMENTS

| | | | |
|---|---|---|---|
| 10,200,279 B1* | 2/2019 | Aljaedi | H04L 43/20 |
| 2021/0234785 A1* | 7/2021 | Green | H04L 47/35 |
| 2023/0104129 A1* | 4/2023 | Miriyala | G06F 9/541 |
| | | | 709/220 |

* cited by examiner

*Primary Examiner* — Kim T Nguyen
(74) *Attorney, Agent, or Firm* — King Intellectual Asset Management

(57) ABSTRACT

The disclosure provides an example method for live packet tracing. Some embodiments of the method include configuring a first network interface of a first pod to mark each of a plurality of packets, with a corresponding flow tag and a corresponding packet identifier, receiving, from one or more observation points, at least one of copies or metadata of the plurality of packets each marked with the corresponding flow tag and the corresponding packet identifier. In some embodiments, the method further includes displaying data indicative of the at least one of the copies or the metadata of the plurality of packets.

20 Claims, 2 Drawing Sheets

LIVE TRAFFIC TRACING FOR PODS IN A NETWORK

CROSS-REFERENCE TO RELATED PARAGRAPHS

The present application claims priority to International Patent Application No. PCT/CN2023/000008, filed Jan. 13, 2023, and entitled "Live Traffic Tracing for Pods in a Network," the entirety of which is incorporated by reference herein.

BACKGROUND

Software defined networking (SDN) involves a plurality of hosts in communication over a physical network infrastructure of a data center (e.g., an on-premise data center or a cloud data center). The physical network to which the plurality of physical hosts are connected may be referred to as an underlay network. Each host has one or more virtualized endpoints such as virtual machines (VMs), containers, Docker containers, data compute nodes, isolated user space instances, namespace containers, and/or other virtual computing instances (VCIs) that are connected to, and may communicate over, logical overlay networks. For example, the VMs and/or containers running on the hosts may communicate with each other using an overlay network established by hosts using a tunneling protocol.

In some cases, applications packaged into one or more groups of containers may be deployed on a single VM or a physical machine. Such a group of containers may be referred to as a pod. More specifically, a pod is a group of one or more containers, with shared storage and network resources, and a specification for how to run the containers. The single VM or physical machine running a pod may be referred to as a node running the pod. In particular, a container is a package that relies on virtual isolation to deploy and run applications that access a shared operating system (OS) kernel. From a network standpoint, containers within a pod share a same network namespace, meaning they share the same internet protocol (IP) address or IP addresses associated with the pod.

A network plugin, such as a container networking interface (CNI) plugin, may be used in many environments, such as in many Kubernetes® environments, to create virtual network interface(s) usable by the pods for communicating on respective logical networks of the SDN infrastructure. The network plugin is a runtime executable that configures a network interface, referred to as a pod interface, into a container network namespace. A network interface of a pod is a software-based interface, similar to a virtual network interface card, that is configured to exchange packets between the pod and a network. For example, the network interface may exchange packets between the pod and a virtual switch to which the pod is coupled. The network plugin is further configured to assign a network address (e.g., an IP address) to each created network interface (e.g., for each pod) and may also add routes relevant for the interface. Pods can communicate with each other using their respective IP addresses via the pod interfaces. For example, packets sent from a source pod to a destination pod may include a source IP address of the source pod and a destination IP address of the destination pod, so that the packets are appropriately routed over a network from the source pod to the destination pod.

Additionally, a networking diagnosis tool may be used, such as to diagnose the state of the network by tracing a forwarding path of a packet through the overlay network. As an example, Antrea™ may utilize Traceflow™ as a network diagnosis tool.

While some solutions provide some ability to monitor traffic flow in a network environment including pods, these current solutions are often only capable of monitoring a single packet and have many other limitations. Accordingly, a need exists in the industry for live traffic tracing in a network environment including pods.

SUMMARY

The disclosure provides an example method for live packet tracing. Some embodiments of the method include configuring a first network interface of a first pod to mark each of a plurality of packets, with a corresponding flow tag and a corresponding packet identifier, receiving, from one or more observation points, at least one of copies or metadata of the plurality of packets each marked with the corresponding flow tag and the corresponding packet identifier. In some embodiments, the method further includes displaying data indicative of the at least one of the copies or the metadata of the plurality of packets.

Some embodiments include a system for live packet tracing. Embodiments of the system include one or more processors and at least one memory. The one or more processors and the at least one memory may be configured to configure a first network interface of a first pod to mark each of a plurality of packets, with a corresponding flow tag and a corresponding packet identifier, receive, from one or more observation points, at least one of copies or metadata of the plurality of packets each marked with the corresponding flow tag and the corresponding packet identifier, and display data indicative of the at least one of the copies or the metadata of the plurality of packets.

Further embodiments include a non-transitory computer-readable storage medium storing instructions that, when executed by a computer system, cause the computer system to perform operations for live packet tracing. The operations may include configuring a first network interface of a first pod to mark each of a plurality of packets, with a corresponding flow tag and a corresponding packet identifier, receiving, from one or more observation points, at least one of copies or metadata of the plurality of packets each marked with the corresponding flow tag and the corresponding packet identifier, and displaying data indicative of the at least one of the copies or the metadata of the plurality of packets.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
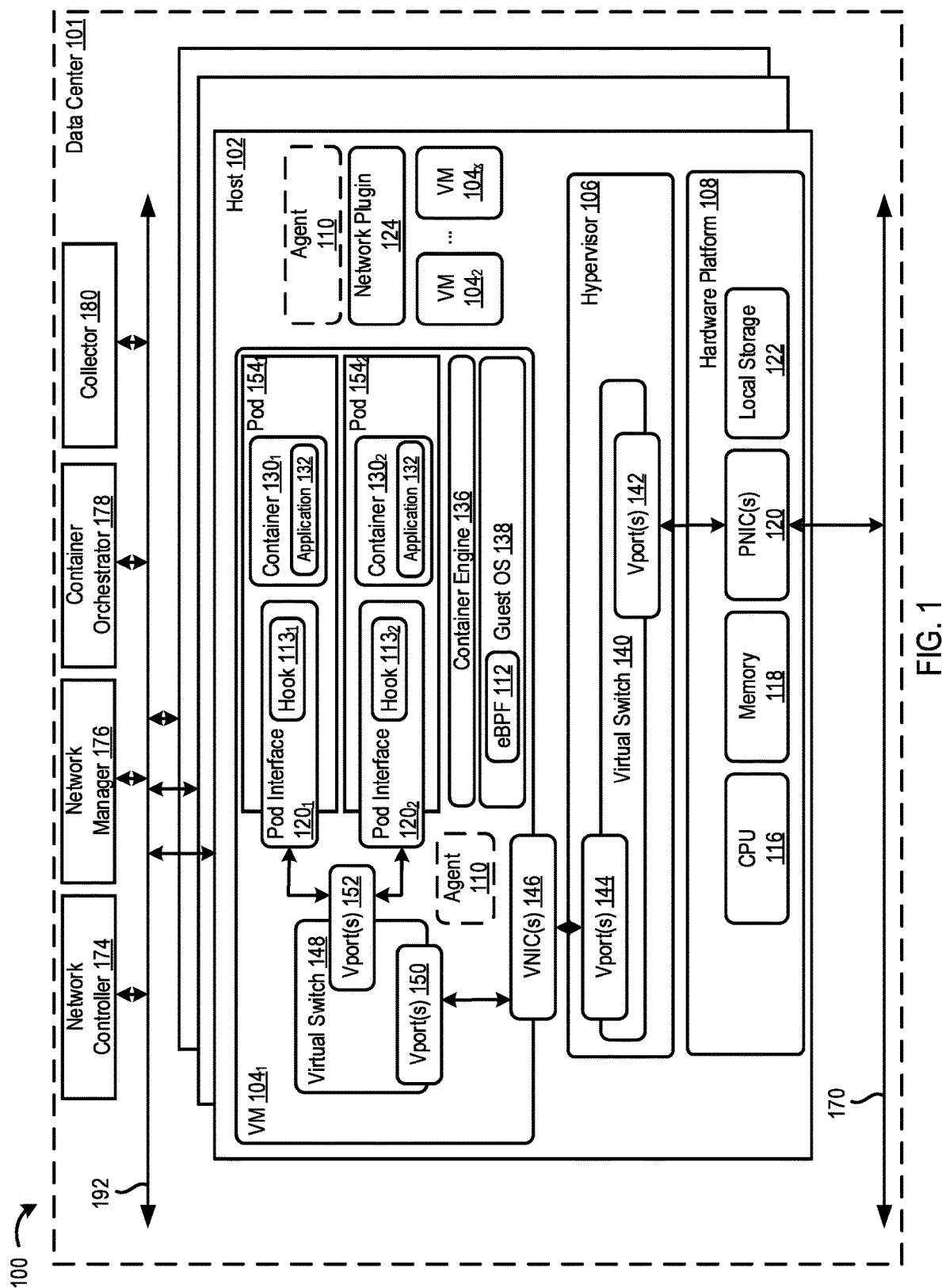
FIG. 1 depicts a computing system in which embodiments described herein may be implemented.

Improved techniques for tracing network traffic associated with pods in a network are described herein. Traffic associated with pods may refer to traffic sent by a source pod to a destination endpoint (e.g., a pod, a physical machine, a VCI, etc.). Though certain aspects are described with respect to traffic associated with pods, the techniques discussed herein may further be used with other suitable VCIs, such as at network interfaces of other suitable VCIs.

Certain aspects herein provide techniques for marking one or more packets at a network interface (e.g., a pod interface) of a source pod. In certain aspects, a packet is marked by inserting a flow tag into a field in the header of a packet, the flow tag being a value that is the same for all marked packets of a flow. The flow tag value for a flow may be generated randomly, sequentially for different flows, or using any other suitable technique. Accordingly, all packets marked with the flow tag are associated with the same flow. In certain aspects, the flow tag is inserted as a differentiated services code point (DSCP) value (e.g., 6-bit value) in the differentiated services field (e.g., 8-bit field) of an internet protocol (IP) header of the packet. The packet is further marked by inserting a packet identifier (id) into a field in a header of the packet, the packet id identifying the packet itself, and being a different value for different packets of a flow. The packet id value for a packet may be generated randomly, sequentially for different packets, or using any other suitable technique. In certain aspects, the packet id is inserted in an IP identification (IPID) field of the IP header of the packet. Though certain aspects are discussed with respect to inserting the flow tag as a DSCP in the packet, and a packet id in an IPID field of the packet, it should be noted that other fields of packet headers may similarly be used.

Marking a packet with a flow tag allows a diagnosis tool to correlate packets associated with a same flow, to diagnose how multiple packets of the flow are handled through a network environment. Further, marking a packet with a packet identifier allows multiple packets of the flow to be correlated for diagnosis, and for the same packet observed at different observation points to be correlated. An observation point may refer to any network component where a packet is captured in a network and metadata gathered about the packet, such as to diagnose network traffic in the network. Example observation points include physical or virtual switches, physical or virtual routers, firewalls, physical machines, gateways, VCIs, and/or the like. Accordingly, techniques discussed herein allow diagnosis of network traffic at a flow level throughout a network environment. Previous solutions did not allow diagnosis of network traffic at a flow level, but rather at a single packet level. Therefore, the techniques discussed herein solve a technical problem rooted in computer technology, namely how to allow diagnosis of network traffic at a flow level in a computer network. The technical solution is a mechanism for tagging packets at a pod interface of a pod.

A flow is a unidirectional sequence of packets that all share a certain set of attributes which define a unique key for the flow (e.g., source IP address, destination IP address, IP protocol, source port, destination port, and protocol, which may be referred to as a 5-tuple). For example, a source IP address may be associated with a particular endpoint (referred to as a source endpoint of the flow) and the source port number may be associated with a particular application (referred to as a source application of the flow) running in the source endpoint. Further, a destination IP address may be associated with a particular endpoint (referred to as a destination endpoint of the flow) and the destination port number may be associated with a particular application (referred to as destination application of the flow) running in the destination endpoint. A flow, therefore, may correspond to packets sent from a particular source application (e.g., container running in a pod) to a particular destination application, using a particular protocol. In some cases, other attributes may be used to define packets of a flow, such as input interface port, and type of service, such as in addition to the 5-tuple.

In certain aspects, to mark packets, a hook is inserted into the software stack of the pod interface. Accordingly, when an egress packet (i.e., outbound packet sent from the source pod to a destination endpoint) is received at the software stack, the packet is passed to an eBPF program running in a kernel of an operating system (OS) of the pod runs on. The eBPF program is configured to mark the packet as discussed, such as with a flow tag and a packet id. Though certain aspects are discussed herein with respect to an eBPF program used to mark packets, other techniques for marking packets may be used, such as the use of iptables rules. Accordingly, the embodiments discussed herein allow packets to be sampled and marked at a pod interface of a pod, such that they are sampled prior to being passed to other network components, such as a virtual switch. This allows greater flexibility in tracing packets, as compared to solutions that sample packets only after leaving the pod, such as at a virtual switch.

In certain aspects, the marked packets may be captured at one or more observation points (e.g., physical or virtual switches, physical or virtual routers, firewalls, physical machines, gateways, VCIs, and/or the like) within the networking environment. Copies of the marked packets and/or metadata associated with the marked packets may be sent to a collector, such as to expose the data to an administrator, or providing tracing path information for flows and packets. The metadata may include for example, network address translation (NAT) information regarding NAT applied to the packet, a timestamp of when the packet is observed, information regarding encapsulation/decapsulation for tunneling applied to the packet, packet header information, an identifier of the observation point, tables used to process packets, IPID, DSCP, 5-tuple, and/or the like.

In certain aspects, techniques herein further allow marking of packets corresponding to both a forward flow between two endpoints and a reverse flow between two endpoints, such as to provide correlated analysis of both forward and reverse flows. As packets may be exchanged in both directions between first and second applications running on first and second endpoints, there may be two flows corresponding to packets exchanged between the applications using a particular protocol, one of which may be assigned as the request direction flow (i.e., forward flow) and the other of which may be assigned as the response direction flow (i.e., reverse flow). For example, a first flow may refer to packets from the first application as a source application to the second application as a destination application. A second flow may refer to packets from the second application as a source application to the first application as a destination application. For the two flows corresponding to packets exchanged between the applications using a particular protocol, in certain aspects, the flow associated with the direction in which packets are initially sent (e.g., within a time period) may be referred to as the request direction flow. For example, where at a time 0, the first application sends packets to the second application, and only after at a time 0+t, the second application sends packets to the first application, the first flow may be referred to as the request direction flow, and the second flow may be referred to as the response direction flow.

In certain aspects, packets of a forward flow and a corresponding reverse flow are marked with the same flow tag, so as to be able to correlate analysis of the flows. In certain aspects, data is kept associated the flow tag of a forward flow and the flow tag of a corresponding reverse flow, such as to be able to correlate analysis of the flows.

FIG. 1 depicts example physical and virtual network components in a networking environment 100 in which embodiments of the present disclosure may be implemented. Specifically, networking environment 100 includes a data center 101. Data center 101 includes one or more hosts 102, a management network 192, a data network 170, a network controller 174, a network manager 176, a container orchestrator 178, and a collector 180. Data network 170 and management network 192 may be implemented as separate physical networks or as separate virtual local area networks (VLANs) on the same physical network.

Host(s) 102 may be communicatively connected to data network 170 and management network 192. Data network 170 and management network 192 are also referred to as physical or "underlay" networks, and may be separate physical networks or the same physical network as discussed. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 102 may be geographically co-located servers on the same rack or on different racks in any arbitrary location in the data center. Host(s) 102 may be configured to provide a virtualization layer, also referred to as a hypervisor 106, that abstracts processor, memory, storage, and networking resources of a hardware platform 108 into multiple VMs $104_1$-$104_x$ (collectively referred to herein as "VMs 104" and individually referred to herein as "VM 104").

Host(s) 102 may be constructed on a server grade hardware platform 108, such as an x86 architecture platform. Hardware platform 108 of a host 102 may include components of a computing device such as one or more processors (CPUs) 116, system memory 118, one or more network interfaces (e.g., physical network interface cards (PNICs) 120), storage 122, and other components (not shown). A CPU 116 is configured to execute instructions, for example, executable instructions that perform one or more operations described herein and that may be stored in the memory and storage system. The network interface(s) enable host 102 to communicate with other devices via a physical network, such as management network 192 and data network 170.

In certain aspects, hypervisor 106 implements one or more logical switches as a virtual switch 140. Any arbitrary set of VMs in a datacenter may be placed in communication across a logical Layer 2 (L2) overlay network by connecting them to a logical switch. A logical switch is an abstraction of a physical switch that is collectively implemented by a set of virtual switches on each host that has a VM connected to the logical switch. The virtual switch on each host operates as a managed edge switch implemented in software by a hypervisor on each host. Virtual switches provide packet forwarding and networking capabilities to VMs running on the host. In particular, each virtual switch uses hardware based switching techniques to connect and transmit data between VMs on a same host, or different hosts.

Virtual switch 140 may be a virtual switch attached to a default port group defined by a network manager that provides network connectivity to a host 102 and VMs 104 on the host 102. Port groups include subsets of virtual ports ("Vports") of a virtual switch, each port group having a set of logical rules according to a policy configured for the port group. Each port group may comprise a set of Vports associated with one or more virtual switches on one or more hosts 102. Ports associated with a port group may be attached to a common VLAN according to the IEEE 802.1Q specification to isolate the broadcast domain.

A virtual switch 140 may be a virtual distributed switch (VDS). In this case, each host 102 may implement a separate virtual switch corresponding to the VDS, but the virtual switches 140 at each host 102 may be managed like a single virtual distributed switch (not shown) across the hosts 102.

Each of VMs 104 running on host 102 may include virtual interfaces, often referred to as virtual network interface cards (VNICs), such as VNICs 146, which are responsible for exchanging packets between VMs 104 and hypervisor 106. VNICs 146 can connect to Vports 144, provided by virtual switch 140. Virtual switch 140 also has Vport(s) 142 connected to PNIC(s) 120, such as to allow VMs 104 to communicate with virtual or physical computing devices outside of host 102 via data network 170 and/or management network 192.

Each VM 104 may also implement a virtual switch 148 for forwarding ingress packets to various entities running within the VM 104. Such virtual switch 148 may run on a guest OS 138 of the VM 104, instead of being implemented by a hypervisor, and may be programmed, for example, by agent 110 running on guest OS 138 of the VM 104. For example, the various entities running within each VM 104 may include pods 154 including containers 130. Depending on the embodiment, the virtual switch 148 may be configured with open vSwitch (OVS) protocol, which is an open source project to implement virtual switches to enable network automation, while still supporting standard management interfaces and protocols.

In particular, each VM 104 implements a virtual hardware platform that supports the installation of a guest OS 138, which is capable of executing one or more applications. Guest OS 138 may be a standard, commodity operating system. Examples of a guest OS include Microsoft Windows, Linux, and/or the like.

Each VM 104 may include a container engine 136 installed therein and running as a guest application under control of guest OS 138. Container engine 136 is a process that enables the deployment and management of virtual instances (referred to interchangeably herein as "containers") by providing a layer of OS-level virtualization on guest OS 138 within VM 104. Containers 130 are software instances that enable virtualization at the OS level. That is, with containerization, the kernel of guest OS 138, or an OS of host 102 if the containers are directly deployed on the OS of host 102, is configured to provide multiple isolated user space instances, referred to as containers. Containers 130 appear as unique servers from the standpoint of an end user that communicates with each of containers 130. However, from the standpoint of the OS on which the containers execute, the containers are user processes that are scheduled and dispatched by the OS.

Containers 130 encapsulate an application, such as application 132 as a single executable package of software that bundles application code together with all of the related configuration files, libraries, and dependencies required for it to run. Application 132 may be any software program, such as a word processing program or a gaming server.

A user can deploy containers 130 through container orchestrator 178. Container orchestrator 178 implements an orchestration control plane, such as Kubernetes®, to deploy and manage applications and/or services thereof on hosts 102, of a host cluster, using containers 130. For example, container orchestrator 178 may deploy containerized applications as containers 130 and a control plane (e.g., including collector 180 and agent 110) on a cluster of hosts. The control plane, for each cluster of hosts, manages the computation, storage, and memory resources to run containers 130. Further, the control plane may support the deployment and management of applications (or services) on the cluster using containers 130. In some cases, the control plane deploys applications as pods 154 of containers 130 running on hosts 102, either within VMs or directly on an OS of the host. Other types of container-based clusters based on container technology, such as Docker® clusters, may also be considered. Though certain aspects are discussed with pods 154 running in a VM, and container engine 136, agent 110, and virtual switch 148 running on guest OS 138 of VM 104, the techniques discussed herein are also applicable to pods 154 running directly on an OS of host 102. For example, host 102 may not include hypervisor 106, and may instead include a standard operating system. Further, the OS of host 102 may support container engine 136, agent 110, virtual switch 148, pods 154, eBPF 112, etc.

In order for packets to be forwarded to and received by pods 154 and their containers 130 running in a first VM $104_1$, each of the pods 154 may be set-up with a network interface, such as a pod interface 120. The pod interface 120 is associated with an IP address, such that the pod 154, and each container 130 within the pod 154, is addressable by the IP address. Accordingly, after each pod 154 is created, a network plugin 124 is configured to set up networking for the newly created pod 154 enabling the new containers 130 of the pod 154 to send and receive traffic.

Further, network plugin 124 may also configure virtual switch 148 running in VM(s) 104 (e.g., where the created pods 154 are running) to forward traffic destined for the new pods 154. This allows virtual switch 148 to forward traffic for the new pods 154. Accordingly, for example, after receiving the traffic from VNIC 146 directed for a pod $154_1$, virtual switch 148 processes the packets and forwards them (e.g., based on the container's IP address in the packets' header) to a pod $154_1$ by pushing the packets out from Vport 152 on virtual switch 148 connected to pod interface $120_1$ that is configured for and attached to a pod $154_1$. As shown, other pod interfaces, such as pod interface $120_2$, may be configured for and attached to different, existing a pods 154.

As also illustrated, embodiments may install an eBPF program 112 into the kernel of the OS of the node that is hosting pod 154 for marking packets as discussed, such as with a flow tag and a packet id. Specifically, as discussed, a hook may be inserted at the pod interface 120 of a pod 154 where packets are to be marked. As packets are passed through such pod interface 120, the hook calls eBPF program 112 to mark the packets. The hook may be dynamically inserted and removed as needed, so as to be able to dynamically mark packets. For example, agent 110 may be configured to install the eBPF program 112 and/or insert/remove the hook.

Agent 110 may be directed by collector 180, which may be controlled by an administrator. For example, an administrator may determine to trace packets originated at a first pod 154. Accordingly, collector 180 may send a message to agent 110, identifying first pod 154 and instructing agent 110 to cause packets sent from first pod 154 to be marked, as discussed.

In certain aspects, agent 110 is configured to cause virtual switch 148, or other suitable observation points, such as virtual switch 140, to inspect packets received at virtual switch 148. Virtual switch 148 inspects the packets to determine whether they are marked, such as with a flow tag and packet id. In certain aspects, for packets identified as marked, virtual switch 148 passes a copy of the packet and/or metadata of the packet to agent 110, which sends the copy of the packet and/or metadata of the packet to collector 180, such as via management network 192.

Collector 180 may be configured to receive copies of marked packets and/or metadata of marked packets, and present such data to a user, such as to trace packet flows, look for issues in the network environment, etc. Collector 180 may be a physical machine, a VCI, or some type of distributed or clustered applications or components.

In certain aspects, collector 180 is further configured to cause agent 110 to trace packets for a reverse flow associated with a forward flow. For example, collector 180 may receive marked packets and/or metadata of marked packets for packets corresponding to a first flow with a first pod 154 as a source pod, and a second pod 154 as a destination pod (the pods on the same or different nodes). The first flow may be considered a forward flow. Accordingly, collector 108 may send a message to an agent 110 running on the node running the second pod 154 to cause packets corresponding to the reverse flow sent from the second pod 154 to the first pod 154 to be marked. In certain aspects, the collector 108 causes the agent 110 to cause the packets of the reverse flow to be marked with the same flow tag as the forward flow. In certain aspects, the collector 108 causes the agent 110 to use a different flow tag for the reverse flow as the forward flow, but stores a correlation between the flow tag of the forward flow and the reverse flow.

Data center 101 also includes a network management plane and a network control plane. The management plane and control plane (and also collector 180) each may be implemented as single entities (e.g., applications running on a physical or virtual compute instance), or as distributed or clustered applications or components. In alternative aspects, a combined manager/controller application, server cluster, or distributed application, may implement both management and control functions. In the embodiment shown, network manager 176 at least in part implements the network management plane and network controller 174 at least in part implements the network control plane.

The network control plane is a component of software defined network (SDN) infrastructure and determines the logical overlay network topology and maintains information about network entities such as logical switches, logical routers, endpoints, etc. The logical topology information is translated by the control plane into physical network configuration data that is then communicated to network elements of host(s) 102. Network controller 174 generally represents a network control plane that implements software defined networks, e.g., logical overlay networks, within data center 101. Network controller 174 may be one of multiple network controllers executing on various hosts in the data center that together implement the functions of the network control plane in a distributed manner. Network controller 174 may be a computer program that resides and executes in a server in the data center 101, external to data center 101 (e.g., such as in a public cloud) or, alternatively, network controller 174 may run as a virtual appliance (e.g., a VM) in one of hosts 102. Network controller 174 collects and distributes information about the network from and to endpoints in the network. Network controller 174 may communicate with hosts 102 via management network 192, such as through control plane protocols. In certain aspects, network controller 174 implements a central control plane (CCP) which interacts and cooperates with local control plane components, e.g., agents, running on hosts 102 in conjunction with hypervisors 106.

Network manager 176 is a computer program that executes in a server in networking environment 100, or alternatively, network manager 176 may run in a VM 104, e.g., in one of hosts 102. Network manager 176 communicates with host(s) 102 via management network 192. Network manager 176 may receive network configuration input from a user, such as an administrator, or an automated orchestration platform (not shown) and generate desired state data that specifies logical overlay network configurations. For example, a logical network configuration may define connections between VCIs and logical ports of logical switches. Network manager 176 is configured to receive inputs from an administrator or other entity, e.g., via a web interface or application programming interface (API), and carry out administrative tasks for data center 101, including centralized network management and providing an aggregated system view for a user.

Figure 2:
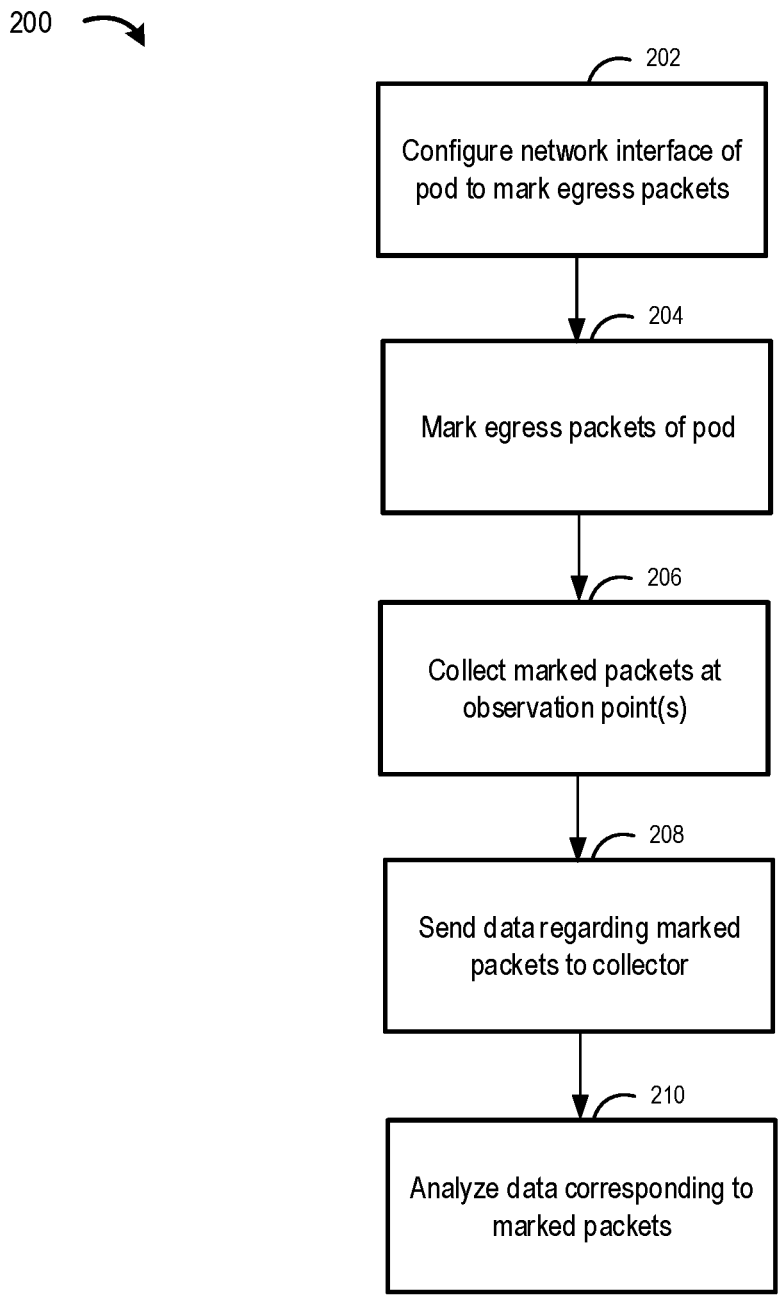
FIG. 2 depicts a flowchart of a process for tracing a packet in a network environment, according to embodiments provided herein.

FIG. 2 depicts a flow chart of a process 200 for tracing a packet. At block 202, a network interface of a first pod is configured to mark egress packets with a flow tag and a packet id. For example, an administrator, via a graphical user interface (GUI) provided by collector 180, may indicate that egress packets from a first pod should be marked. In certain aspects, the administrator indicates all egress packets should be marked. In certain aspects, the administrator indicates packets of a certain flow should be marked, such as by identifying a 5-tuple of the flow. In certain aspects, the administrator indicates that a certain number of packets (e.g., two or more) of a certain flow should be marked. In certain aspects, the administrator indicates that packets (e.g., of a flow) should be marked at a particular interval (e.g., every X time interval, every Y packets, etc.). The collector 180 may cause agent 110 to configure hook 113 and eBPF 112 accordingly, to cause egress packets of the first pod to be marked, as indicated.

At block 204, egress packets from the first pod are marked and sent on the network. For example, hook 113 may cause egress packets received at pod interface 120 of the first pod to be sent to eBPF 112 for processing. In certain aspects, eBPF 112 determines whether the packet meets the indicated one or more criteria (e.g., associated with a flow, number of packets, interval, and/or the like), and if so, marks the packet. The marked packets continue processing at pod interface 120 and are sent over the network via virtual switch 148.

At block 206, marked packets are collected at an observation point. For example, virtual switch 148, as configured by agent 110, inspects packets and sends a copy of marked packets and/or metadata of marked packets to agent 110. In certain aspects, agent 110 causes virtual switch 148 to only collect packets that meet one or more criteria (e.g., associated with a flow, have a particular flow tag and/or packet id, etc.).

At block 208, copies of the marked packets and/or metadata are sent to a collector. For example, agent 110 sends the copies of the marked packets and/or metadata to collector 180.

At block 210, the collector analyzes and/or presents data corresponding to the marked packets. For example, the collector may collect data from multiple observation points and trace a path of one or more packets associated with a flow, and provide information about the flow and the path taken through the network. In certain aspects, the information also correlates forward and reverse flow information, such as whether the same set of observation points is passed for the forward and reverse flows, or different observation points such that different paths are taken.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for live packet tracing to allow diagnosis of network traffic at a flow level in a computer network, comprising:
configuring a first network interface of a first pod to mark each of a plurality of packets with a corresponding flow tag and a corresponding packet identifier;
receiving, from one or more observation points, at least one of copies or metadata of the plurality of packets each marked with the corresponding flow tag and the corresponding packet identifier; and
displaying data indicative of the at least one of the copies or the metadata of the plurality of packets.

2. The method of claim 1, wherein configuring the first network interface comprises:
inserting a hook at the first network interface; and
installing a program at a node running the first pod, wherein the hook calls the program to mark a packet when the packet is received at the first network interface.

3. The method of claim 2, wherein the program is an eBPF program.

4. The method of claim 1, wherein the corresponding flow tag is included as a differentiated services code point (DSCP) value in each of the plurality of packets.

5. The method of claim 1, wherein the corresponding packet identifier is included in an internet protocol identification (IPID) field in each of the plurality of packets.

6. The method of claim 1, wherein the first network interface of the first pod is configured to mark packets transmitted to a second pod, and further comprising configuring a second network interface of the second pod to mark packets transmitted to the first pod.

7. The method of claim 6, further comprising correlating a flow tag associated with a forward flow from the first pod to the second pod with a flow tag associated with a reverse flow from the second pod to the first pod.

8. A system for live packet tracing to allow diagnosis of network traffic at a flow level in a computer network comprising:
one or more processors; and
at least one memory, the one or more processors and the at least one memory configured to:
configure a first network interface of a first pod to mark each of a plurality of packets with a corresponding flow tag and a corresponding packet identifier;
receive, from one or more observation points, at least one of copies or metadata of the plurality of packets each marked with the corresponding flow tag and the corresponding packet identifier; and
display data indicative of the at least one of the copies or the metadata of the plurality of packets.

9. The system of claim 8, wherein the one or more processors and the at least one memory are further configured to:
insert a hook at the first network interface; and
install a program at a node running the first pod, wherein the hook calls the program to mark a packet when the packet is received at the first network interface.

10. The system of claim 9, wherein the program is an eBPF program.

11. The system of claim 8, wherein the corresponding flow tag is included as a differentiated services code point (DSCP) value in each of the plurality of packets.

12. The system of claim 8, wherein the corresponding packet identifier is included in an internet protocol identification (IPID) field in each of the plurality of packets.

13. The system of claim 8, wherein the first network interface of the first pod is configured to mark packets transmitted to a second pod, and wherein the system is further configured to configure a second network interface of the second pod to mark packets transmitted to the first pod.

14. The system of claim 13, wherein the one or more processors and the at least one memory are further configured to correlate a flow tag associated with a forward flow from the first pod to the second pod with a flow tag associated with a reverse flow from the second pod to the first pod.

15. A non-transitory computer-readable medium comprising instructions that, when executed by one or more processors of a computing system, cause the computing system to perform operations for live packet tracing to allow diagnosis of network traffic at a flow level in a computer network, the operations comprising:

configuring a first network interface of a first pod to mark each of a plurality of packets with a corresponding flow tag and a corresponding packet identifier;

receiving, from one or more observation points, at least one of copies or metadata of the plurality of packets each marked with the corresponding flow tag and the corresponding packet identifier; and displaying data indicative of the at least one of the copies or the metadata of the plurality of packets.

16. The non-transitory computer-readable medium of claim 15, the operations further comprising:

inserting a hook at the first network interface; and installing a program at a node running the first pod, wherein the hook calls the program to mark a packet when the packet is received at the first network interface.

17. The non-transitory computer-readable medium of claim 15, wherein the corresponding flow tag is included as a differentiated services code point (DSCP) value in each of the plurality of packets.

18. The non-transitory computer-readable medium of claim 15, wherein the corresponding packet identifier is included in an internet protocol identification (IPID) field in each of the plurality of packets.

19. The non-transitory computer-readable medium of claim 15, wherein the first network interface of the first pod is configured to mark packets transmitted to a second pod, and wherein the operations further comprise configuring a second network interface of the second pod to mark packets transmitted to the first pod.

20. The non-transitory computer-readable medium of claim 19, the operations further comprising correlating a flow tag associated with a forward flow from the first pod to the second pod with a flow tag associated with a reverse flow from the second pod to the first pod.

* * * * *